No. 750,389. PATENTED JAN. 26, 1904.
J. A. PAYNE.
GLAZED STRUCTURE.
APPLICATION FILED APR. 13, 1903.
NO MODEL.
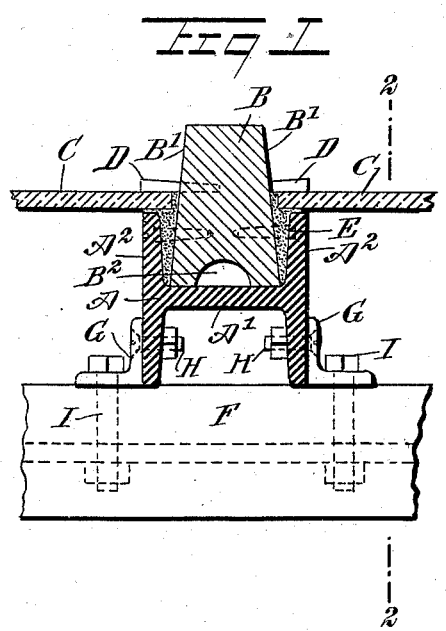
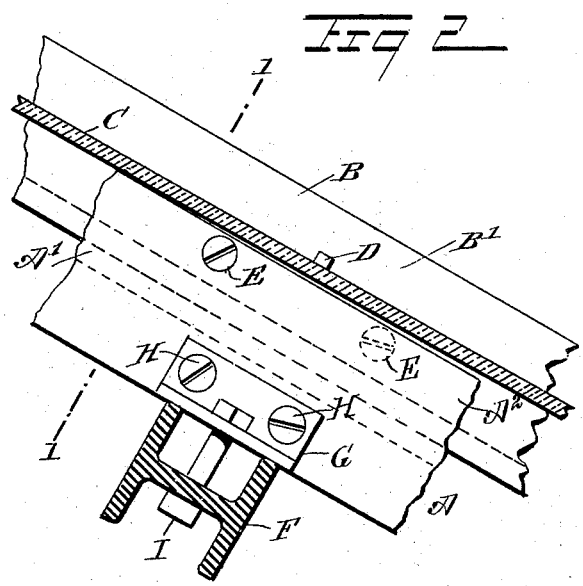
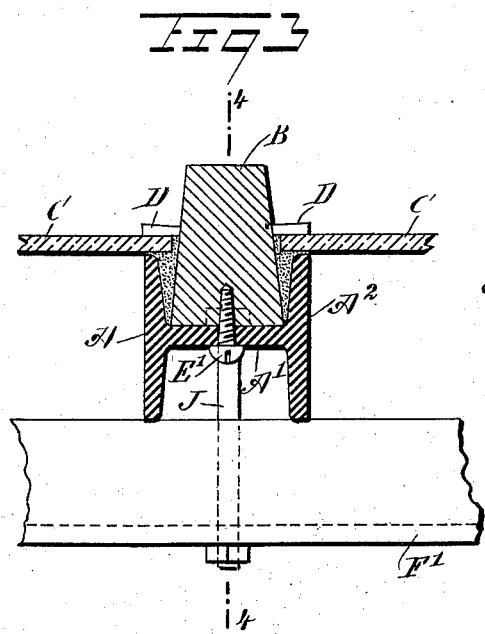
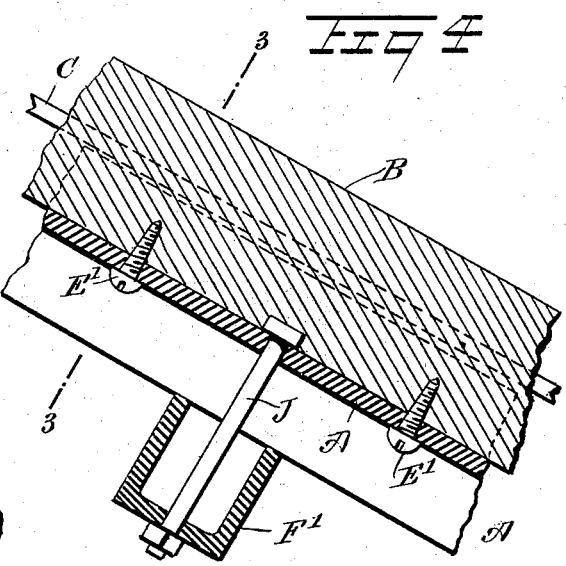
WITNESSES:
H. Walker
INVENTOR
John A. Payne
BY
ATTORNEYS.

No. 750,389. Patented January 26, 1904.

UNITED STATES PATENT OFFICE.

JOHN A. PAYNE, OF JERSEY CITY, NEW JERSEY.

GLAZED STRUCTURE.

SPECIFICATION forming part of Letters Patent No. 750,389, dated January 26, 1904.

Application filed April 13, 1903. Serial No. 152,399. (No model.)

*To all whom it may concern:*

Be it known that I, JOHN A. PAYNE, a subject of the King of Great Britain, and a resident of Jersey City, in the county of Hudson and State of New Jersey, have invented a new and Improved Glazed Structure, of which the following is a full, clear, and exact description.

The invention relates to the construction of greenhouses, skylights, and similar structures; and its object is to provide a new and improved glazed structure which is simple and durable in construction and arranged to combine strength with lightness and preserve the wood against the ill effects of moisture, thereby insuring long life of the structure.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a cross-section of the improvement on the line 1 1 of Fig. 2. Fig. 2 is a longitudinal section of the same on the line 2 2 of Fig. 1. Fig. 3 is a cross-section of a modified form of the improvement, the section being on the line 3 3 of Fig. 4; and Fig. 4 is a longitudinal section of the same on the line 4 4 of Fig. 3.

The sash-bar for the glazed structure, as shown in the drawings, consists, essentially, of a metallic I-beam A and a wooden bar B, having tapering sides B' and resting with its bottom on the middle member A' of the I-beam, the arrangement being such that the lower portion of the wooden bar B extends lengthwise in the upper half of the I-beam, and the upper portion of the wooden bar passes between glasses C and projects beyond the same, the glasses being supported by the end members A² of the I-beam. Spaces are formed between the tapering sides B' of the wooden bar B and the inner adjacent faces of the end members A² of the I-beam A, and in the said spaces is placed putty or a preserving substance, the putty also extending onto the top edge of the side members A² and the edges of the glasses C, as plainly indicated in Fig. 1, to prevent leakage of water or moisture to the inside of the structure.

The usual fastening devices D, driven into the upper portion of the wooden bar B, serve to hold the glasses in place on the I-beam, and the wooden bar is fastened in position on the I-beam by screws E or other fastening devices, the screws extending through the end members A² and screwing into the lower portion of the wooden bar B; but, if desired, screws E' may be employed, as shown in Fig. 3, and passed through the middle member A' of the I-beam to screw into the bottom of the wooden bar B.

The under side or bottom of the wooden bar B is provided with a longitudinally-extending drainage-groove B² to carry off any moisture or water that may possibly pass into the upper portion of the I-beam and the lower end of the wooden bar B.

The I-beam A of the sash-bar rests with the lower edges of its end members A² on a longitudinally-extending purlin or girder F, preferably made in the form of an I-beam, as shown in Fig. 2, or a girder or purlin F' is in the shape of a U-beam, as indicated in Figs. 3 and 4. In the construction shown in Figs. 1 and 2 the I-beam A is secured in position on the purlin or girder F by angle-irons G, fastened by bolts H to the end members A² and by bolts I to the middle member of the girder or purlin F, so that an exceedingly strong and durable connection is made between the sash-bar and its supporting girder or purlin.

In the arrangement shown in Figs. 3 and 4 the I-beam A is fastened by bolts J to the middle portion of the U-shaped girder or purlin F', the said bolt also engaging the middle member of the I-beam A.

From the foregoing it will be seen that an exceedingly strong structure is obtained, and the water can readily drain off the tapering exposed sides of the wooden bar B, so that the danger of leakage at the sash is reduced to a minimum.

Having thus described my invention, I claim as new and desire to secure by Letters Patent—

1. A glazed structure provided with a sash-bar comprising an I-beam, a wooden bar having tapering sides and resting with its base on the middle member of the I-beam, a portion of the wooden bar extending between the glasses and projecting beyond the same, the lower portions of the said tapering sides forming spaces with the inner adjacent faces of the end members of the I-beam, for the reception of putty or the like, the said wooden bar being provided at its bottom with a longitudinally-extending drainage-groove, and means for fastening the wooden bar in position on the I-beam, as set forth.

2. A glazed structure provided with a sash-bar comprising an I-beam, a wooden bar having four flat longitudinal faces, with the bottom one of said faces resting on the middle member of the I-beam and having a longitudinal drainage-groove, the sides of said bar tapering inwardly toward each other from the bottom to the top, a portion of the wooden bar extending between the glasses and projecting beyond the same, the lower portions of the said tapering sides from their bottoms upwardly to the outer face of the glass forming spaces with the inner adjacent faces of the end members of the I-beam, for the reception of putty or the like, means for fastening the wooden bar in position on the I-beam, a girder for the I-beam to rest on, in the shape of an I-beam, and means for fastening the I-beam of the sash-bar to the said girder, as set forth.

3. In a glazed structure, a metal beam having vertical flanges joined together by a connecting-web, a wooden bar resting on the web of the beam and projecting above the flanges of the said beam, the said bar being of less width than the distance between the said flanges, a packing of an impervious substance filling the spaces between the opposite sides of the bar and the beam-flanges, and means for securing the said bar in position, as set forth.

4. In a glazed structure, a metal beam having vertical flanges and a web connecting the same, a wooden bar resting upon the web of the beam and projecting above its flanges, said bar having its sides tapering upwardly and inwardly toward each other whereby a space will be left on each side of the bar between it and the flanges of the beam, a material such as putty filling the spaces between the bar and beam-flanges, and means for securing the said bar in position, as set forth.

5. In a glazed structure, a metal beam having vertical flanges and a web connecting the same, a wooden bar resting upon the web and projecting above the flanges of the said beam, the said bar being of less width than the distance between the said flanges, a packing of an impervious substance filling the spaces between the opposite sides of the bar and the beam-flanges, means for securing the bar on the beam, a girder grooved longitudinally in its upper face and upon which the said beam rests, and means for securing the beam to the girder, as set forth.

In testimony whereof I have signed my name to this specification in the presence of two subscribing witnesses.

JOHN A. PAYNE.

Witnesses:
  THEO. G. HOSTER,
  EVERARD BOLTON MARSHALL.